(12) United States Patent
Boudreaux, Jr. et al.

(10) Patent No.: US 6,584,197 B1
(45) Date of Patent: Jun. 24, 2003

(54) POWER-LIMITED REMOTE TERMINATION CONVERTER WITH WETTING CURRENT AND EMERGENCY POWER OPERATION FOR DIGITAL DATA TRANSMISSION EQUIPMENT

(75) Inventors: Ralph R. Boudreaux, Jr., Madison, AL (US); Steven M. Robinson, Madison, AL (US); John S. McGary, Petersburg, TN (US); Paul G. McElroy, Huntsville, AL (US)

(73) Assignee: Adtran Inc., Huntsville, AL (US)

( * ) Notice: Subject to any disclaimer, the term of this patent is extended or adjusted under 35 U.S.C. 154(b) by 0 days.

(21) Appl. No.: 09/378,382

(22) Filed: Aug. 20, 1999

Related U.S. Application Data (60) Provisional application No. 60/110,757, filed on Dec. 3, 1998.

(51) Int. Cl.[7] .............................. H04M 1/00; H04M 9/00
(52) U.S. Cl. ................. 379/413.02; 379/413; 379/1.01; 379/9.05; 379/324; 700/286; 363/146
(58) Field of Search .......................... 379/387, 413.01, 379/1.03, 93.01, 93.05, 93.06, 93.07, 93.09, 93.14, 399.01, 413, 395.01, 413.02, 93.08, 322, 324, 1.01, 9.05; 700/286; 363/146

(56) References Cited

U.S. PATENT DOCUMENTS

| | | | | |
|---|---|---|---|---|
| 4,575,584 A | * | 3/1986 | Smith et al. ............... 179/81 R |
| 4,984,267 A | | 1/1991 | Martinez ..................... 379/413 |
| 5,131,033 A | | 7/1992 | Reum ......................... 379/413 |
| 5,216,704 A | * | 6/1993 | Williams et al. ............... 379/93 |
| 5,237,606 A | | 8/1993 | Ziermann ................... 379/413 |
| 5,289,359 A | | 2/1994 | Ziermann ..................... 363/21 |
| 5,311,582 A | * | 5/1994 | Davenport et al. .......... 379/143 |
| 5,483,574 A | * | 1/1996 | Yuyama ....................... 379/32 |
| 5,539,805 A | | 7/1996 | Bushue et al. ............... 379/361 |
| 5,581,612 A | * | 12/1996 | Nishikawa ................... 379/387 |
| 5,883,941 A | * | 3/1999 | Akers ....................... 379/93.08 |
| 5,943,404 A | * | 8/1999 | Sansom et al. .......... 379/96.06 |
| 6,272,209 B1 | * | 8/2001 | Bridger et al. ................. 379/27 |
| 6,282,204 B1 | * | 8/2001 | Balatoni et al. ............. 370/421 |
| 6,301,340 B1 | * | 10/2001 | Sansom et al. |
| 6,347,075 B1 | * | 2/2002 | Barzegar et al. ............ 370/228 |
| 6,445,163 B1 | * | 9/2002 | Chenier et al. ............. 320/133 |
| 6,510,067 B1 | * | 1/2003 | Toebes ......................... 363/146 |
| 6,510,204 B2 | * | 1/2003 | De Clercq et al. |
| 6,522,955 B1 | * | 2/2003 | Colborn ....................... 700/286 |

FOREIGN PATENT DOCUMENTS

| | | | | |
|---|---|---|---|---|
| EP | 0984612 A1 | * | 8/2000 | .......... H04M/19/08 |
| GB | 2313979 A | * | 7/1997 | .......... H04M/11/06 |
| WO | WO 01/89262 A2 | * | 11/2001 | .......... H04Q/11/04 |

\* cited by examiner

*Primary Examiner*—Binh Tieu
(74) *Attorney, Agent, or Firm*—Allen, Dyer, Doppelt, Milbrath & Gilchrist, P.A.

(57) ABSTRACT

A power management system is interfaced with both a local utility power source and a remotely powered span, and monitors the power availability for and requirements of DDS terminal equipment. Upon detecting that local utility power is insufficient to operate the terminal equipment, a power limited converter derives power from the phone line. The span power drawn is limited to a fixed value that prevents the line from collapsing. An auxiliary capacitor stores energy from either local utility power or the span, to provide for periods of extended power operation (including ringing the phone).

19 Claims, 5 Drawing Sheets

POWER-LIMITED REMOTE TERMINATION CONVERTER WITH WETTING CURRENT AND EMERGENCY POWER OPERATION FOR DIGITAL DATA TRANSMISSION EQUIPMENT

CROSS-REFERENCE TO RELATED APPLICATION

The present application claims the benefit of U.S. Provisional Patent Application, Ser. No. 60/110,757, filed Dec. 3, 1998, by Ralph R. Boudreaux et al, entitled: "Power-Limited Remote Termination Converter With Wetting Current and Emergency Power Operation for Digital Data Services Equipment," assigned to the assignee of the present application and the disclosure of which is incorporated herein.

FIELD OF THE INVENTION

The present invention relates in general to power management systems and subsystems, and is particularly directed to a new and improved power management scheme for (customer premises installed) digital data services (DDS) telecommunication equipment, that is configured to interface the DDS equipment with both a local utility power source and a telecommunication link (span) that is remotely powered by way of a telecommunication facility, such as a central office. The inventive power management scheme includes an auxiliary energy storage element, such as a capacitor, that stores energy from the local utility power source and the span. The invention monitors the power availability for and requirements of the DDS equipment; if the local utility power is insufficient to maintain proper operation of the DDS equipment, a limited quantity of power is drawn from the span.

BACKGROUND OF THE INVENTION

In addition to sending voice and/or data over the telephone lines, a telecommunication service provider may use the same wires to power circuits, such as DDS terminal devices that are connected to the signal lines at remote locations. The power that is used to operate telecommunication equipment via the signal lines is sourced from the telephone company's central office (CO). This method of remote line powering is commonly referred to as 'loop' or 'span' powering, and permits the phone companies to remotely power terminal equipment that is up to several miles away from the central office. Loop powering is customarily used extensively on mid-span devices (rather than termination devices) in DDS, ISDN, T1, HDSL, and other digital networks. The device at the remote end of the link may or may not continuously need this span-supplied power, or may use this power only during emergency situations. For purposes of the present description, the equipment at the remote end of the link will be referred to as terminating equipment, and typically resides at a customer's premises.

Within the telephone networks of the continental United States, terminating devices for digital data services are generally not span-powered. Instead, the terminating device is typically located within the customer's premises and receives its power from the customer's local utility feed. In normal operating conditions, the only current drawn by the 'locally powered' termination device from the network signal wires is what is commonly termed 'sealing' or 'wetting' current. Wetting current is not necessary for the equipment to operate, but is used to reduce corrosion of the wires and splices between the phone company and the remote location.

However, when local utility power is lost at the customer's premises (for example during a lighting storm), the terminating device will stop functioning. This is problematic for digital services (such as ISDN) that implement plain-old-telephone-service (POTS) support. Should a local power failure occur, there will be a loss of phone service (including emergency service, such as the ability to place a 911 call). As a consequence, customers have traditionally been required to maintain a separate standard analog phone line in addition to the ISDN digital data line(s).

There is currently interest in the both U.S. and abroad to configure terminating devices that can be span-powered. Although there is no applicable U.S. regulation or tariff for span-powering customer premises equipment, the European Telecommunications Standards Institute (ETSI) has released an international technical report ETR080, as a precursor to a possible specification. This technical report recommends that the central office supply between 51 VDC and 115 VDC on the span (depending on its length). The effect of line resistance requires that power drawn by terminal equipment be less than a prescribed value (1100 mW) during worst case conditions. This constitutes a potential problem in the U.S., since a standard ringer equivalency number (REN) load of five (North American) consumes more instantaneous power than is available from the span.

SUMMARY OF THE INVENTION

In accordance with the present invention, these concerns are successfully addressed by a dual power management system, that is readily integrated with customer premises-installed digital data services terminal equipment, and is operative to controllably power such equipment from either or both of a local power source and the span. The invention automatically switches between local powering and remote powering as necessary for terminal equipment operation and sinks wetting current from the network during local powering.

As will be described, the invention is configured to monitor the power availability for and power requirements of termination equipment and, in response to local power being insufficient to maintain operation, derives from the phone line up to a maximum amount of power, which is limited to a fixed value that prevents the line from collapsing, and satisfies current industry proposals, such as that contained in the above-referenced ETR080 report. The inventive power management scheme includes an auxiliary energy store that is controllably operative to store a limited quantity of energy from the local utility interface or the span, so as to enable extended power operation (including ringing the phone).

The general architecture of the dual power management system of the present invention includes a local utility interface and a span interface. The local utility interface has barrier—isolation transformer circuitry configured to connect to a local utility interface—typically, an AC wall outlet—which isolates and transforms the utility voltage to a safe level, such as 42 VDC. A main power converter is coupled to receive the local utility voltage and supplies various regulated voltages as required for terminal equipment communication subsystems.

In addition to being coupled to the local utility interface, the main power converter is coupled to a power limited converter within the span interface. Normally, the span interface provides a signaling interface with the telephone lines, and sinks wetting current. In addition, in response to insufficient local power, the power limited converter derives power from the span to maintain terminal equipment operation. Controlled extraction of a limited amount of power from the span is carried out by a power-limited converter, in response to a reduction or loss of power from the local utility. During this 'span'—powered mode, the power-limited converter controllably charges an auxiliary energy storage capacitor that is coupled in circuit with each of the local utility interface section, the span interface section and the main power converter. The auxiliary energy storage capacitor is normally charged by transformed voltage from the local utility interface.

A power availability sensing and control unit is coupled to a terminal device control processor and to associated interface circuits, and serves to monitor a number of operational parameters, including performance of the local utility interface, the span, and the amount of energy stored in the auxiliary storage capacitor. This information is used to control various power management subsystems, such as modulation of the span interface section's power limited converter, current limit, start-up control, undervoltage lockout, etc. Undervoltage lockout (UVLO) and start-up circuits are included to ensure that the power circuits are disabled for conditions outside their intended operating range, and to provide for a smooth start-up when power is initially applied.

Should there be a failure or unacceptable reduction of the local utility power, the sensing and control unit will switch the operation of the power management system to 'span-powered' mode, so that the power limited converter within the span interface unit will begin drawing the maximum power available from the network, until the auxiliary energy storage capacitor is fully charged. Once the auxiliary storage capacitor is fully charged, the span power will be modulated so as to draw only energy necessary for the terminal equipment to operate.

Should the terminal equipment require more than the limited amount of power allowed to be drawn from the span (such as for ringing the phone), the power limited converter will again pull this maximum power from the network; any deficit in required energy will be drawn from the auxiliary storage capacitor. Once the capacitor has been fully recharged, the power limited converter will again reduce the power transfer. In the case of a severely excessive ringing load, the storage capacitor will not have sufficient energy to power the terminal equipment for the full cadence period of the ringing signal. If the capacitor voltage decreases to near the minimum value necessary for the equipment to operate, the sensing and control unit will temporarily inhibit ringing, in order to prevent the terminal equipment from shutting down. Ringing will then continue during the next cadence period.

The power limited converter circuitry includes an electronic switch installed in circuit with the primary winding of a transformer, which has a secondary winding coupled in a charge path to the auxiliary energy storage capacitor. Conduction through the switch is modulated by adjusting the frequency of an output waveform produced by a variable frequency oscillator. When a peak detector senses that the value of the primary current has reached a prescribed level, it signals a control circuit to turn the electronic switch off, so as to interrupt the current flow through the primary winding, causing energy stored in the transformer to be transferred to the capacitor as the secondary current decays. The decay of the secondary current occurs at a rate determined by the capacitor voltage and secondary inductance. After the energy transfer and a certain amount of idle time has elapsed, this cycle repeats, so that a power-limiting function is achieved by controllably modulating the charging of the capacitor.

When the terminal equipment is being powered by the local utility interface, the control processor is operative to reduce the frequency of the output waveform generated by the variable frequency oscillator to its minimum value, so that the power being delivered by the span is reduced to only the level of wetting current. In the absence of or insufficient local power, however, the oscillator frequency is set to either a maximum—providing a maximum amount of limited power—or modulated between its minimum and maximum values for energy storage regulation.

BRIEF DESCRIPTION OF THE DRAWINGS

FIGS. 4–4A, 4B and 5 schematically illustrate a non-limiting example of a circuit implementation of the power management system of FIGS. 1 and 2.

Figure 1:
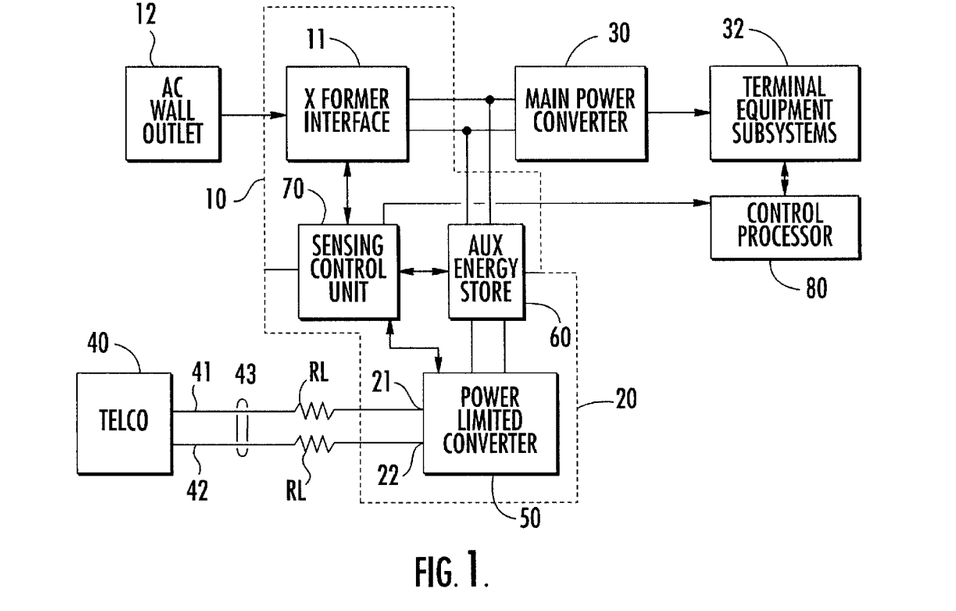
FIG. 1 diagrammatically illustrates the general architecture of the dual power management system of the present invention.

FIG. 1 diagrammatically illustrates the general architecture of the dual power management system of the present invention that includes a local utility interface section 10 and a span interface section 20. The local utility interface section 10 includes barrier—isolation circuitry (e.g., transformer) 11 configured to plug into a standard local utility interface (AC wall outlet) 12. The wall transformer isolates and transforms the utility voltage to a safe level, such as 42 VDC. As long as the local utility interface and the wall transformer are properly connected and operating normally, a main power converter 30 coupled thereto will supply regulated voltages for the terminal equipment's communication subsystems 32 (such as but not limited to logic circuits, computer data interface, user interface displays, POTs interface, etc.). However, if there is a failure or unacceptable reduction of the local utility power, a power limited converter 50 within the span interface unit 20 will be controlled, so as to increase power transfer from the central office to the terminal equipment and thereby maintain terminal equipment operation.

DETAILED DESCRIPTION

Before describing in detail the remote termination-coupled power management scheme of present invention, it should be observed that the invention resides primarily in what is effectively a prescribed combination of discrete circuit components used for power supply applications, and associated signaling interfaces, plus modular arrangements of conventional digital communication circuits and digital signal processing components and attendant supervisory control circuitry therefor, that controls the operations of such circuits and components. In a practical implementation that facilitates their installation with customer premises terminal equipment, these modular arrangements may be readily implemented as application specific integrated circuit (ASIC) chip sets.

Consequently, the configuration of these circuits and components and the manner in which they are interfaced with a local power supply feed, a powered span provided by the telephone company, and customer premises communication equipment, such as but not limited to an ISDN terminal adapter, have been illustrated in the drawings by readily understandable block diagrams and associated circuit schematics, which show only those specific details that are pertinent to the present invention, so as not to obscure the disclosure with details which will be readily apparent to those skilled in the art having the benefit of present description. Thus, the diagrammatic and circuit illustrations of the Figures are primarily intended to illustrate the major components of the system in a convenient functional grouping, whereby the present invention may be more readily understood.

FIG. 1 diagrammatically illustrates the general architecture of the dual power management system of the present invention that includes a local utility interface section 10 and a span interface section 20. The local utility interface section 10 includes barrier—isolation circuitry (e.g., transformer) 11 configured to plug into a standard local utility interface (AC wall outlet) 12. The wall transformer isolates and transforms the utility voltage to a safe level, such as 42 VDC. As long as the local utility interface and the wall transformer are properly connected and operating normally, a main power converter 30 coupled thereto will supply regulated voltages for the terminal equipment's communication subsystems 32 (such as but not limited to logic circuits, computer data interface, user interface displays, POTs interface, etc.). However, if there is a failure of unacceptable reduction of the local utility power, a power limited converter 50 within the span interface unit 20 will be controlled, so as to increase power transfer from the central office to the terminal equipment and thereby maintain terminal equipment operation.

More particularly, in addition to providing a signaling interface with the telephone lines, and sinking wetting current, the span interface section 20 is configured to extract a controllably limited amount of power from the span, so that operation of the terminal equipment may be maintained when the local utility power is insufficient or down altogether. For this purpose, the span interface section 20 has first and second ports 21 and 22 coupled to respective segments 41 and 42 of a telephone line signaling pair (span) 43, which are powered from a remote telecommunication service provider facility 40, such as a central office (CO), and have an inherent resistance RL. (For extended range applications, one or more repeater modules (not shown) may be installed in the span 43 between the CO and the customer's premises.)

Controlled extraction of a limited amount of power from the span is carried out by a power-limited converter 50, in response to a reduction or loss of power from the local utility. During this 'span' powered mode, the power-limited converter 50 is operative to controllably recharge an auxiliary energy store (capacitor) unit 60, which is coupled in circuit with the local utility interface section 10, the span interface section 20, and the main power converter 30. As will be described, this allows the main power converter 30 to receive energy from any or a combination of the local utility interface section 10, the span interface section 20, and the auxiliary energy store unit 60.

A power availability sensing and control unit 70 is coupled to a terminal equipment control processor 80, and interface circuits therefor and monitors a number of operational parameters, including the performance of the local utility interface, the span, and the amount of energy stored in the auxiliary storage capacitor. As will be described, this information is used to control various power management subsystems, including modulation of the span interface section's power limited converter, current limit, start-up control, undervoltage lockout, etc. Undervoltage lockout (UVLO) and start-up circuits are also incorporated into power management components, to ensure that the power circuits are disabled for conditions outside their intended operating range. This allows a smooth start-up when power is first applied to the terminal equipment.

Before addressing a non-limiting example of a circuit implementation of the power management system of FIG. 1 (shown in FIGS. 4–4A, 4B and 5, to be described), a general overview of its operation will be presented, followed by a reduced complexity illustration and description of the power-limiting mechanism of the power-limited converter 50 within the span interface section 20.

As pointed out above, in normal operation, with the local utility interface and the wall transformer properly connected, the output voltage supplied by the local utility interface section 10 will be above some prescribed minimum value (e.g., on the order of 29 volts DC, as a non-limiting example) that meets the power demands (e.g., 500 mW to 5000 mW) of the terminal equipment. In this 'locally powered' mode, the main power converter 30 supplies regulated voltages for the terminal equipment's communication subsystems, and the power limited converter 50 within the span interface unit 20 will transform only a relatively small amount of power (roughly 50–60 mW) associated with wetting current from the span.

However, if there is a failure or unacceptable reduction of the local utility power, the sensing and control unit 70 will cause the operation of the power management system to be switched to 'span-powered' mode. In this back-up mode, the power limited converter 50 within the span interface unit 20 will begin drawing the maximum power available from the network (e.g., not to exceed 1100 mW), until the auxiliary energy storage (capacitor) unit 60 is fully charged. Once the auxiliary storage capacitor 60 is fully charged, the available span power will be modulated so as to draw only the energy necessary for the terminal equipment to operate.

Should the terminal equipment (temporarily) require more than the limited amount of power (e.g., 1100 mW) that is allowed to be drawn from the network (such as for ringing the phone), the power limited converter 50 will again pull the maximum power (1100 mW) from the network; any deficit in required energy will be drawn from the auxiliary storage capacitor 60. As energy is removed from the storage capacitor 60, its voltage will decrease. Once the temporary overload has ceased, the storage capacitor 60 will begin to recharge and its voltage will start increasing. When the capacitor 60 has been fully recharged, the power limited converter 50 will again reduce the power transfer.

In the case of a severely excessive ringing load (more than five REN) the storage capacitor 60 will not have sufficient energy to power the terminal equipment for the full cadence period (e.g., two seconds) of the ringing signal. Should the capacitor voltage decrease to near the minimum value necessary for the equipment to operate, the sensing and control unit 70 will temporarily inhibit ringing, in order to prevent the terminal equipment from shutting down. Ringing will then continue during the next cadence period.

In order to appreciate the power monitoring and limited power control mechanism employed by the power management system of the present invention, it is useful to examine the power availability parameters of the span. Due to the resistance RL of the span 43, only a finite amount of energy can be supplied to the terminating device for a given CO voltage.

The following expression (1) can be derived using $V_{CO}$ for the central office DC supply voltage (in volts), $V_{TE}$ for the voltage at the terminal equipment (in volts), P for the terminal equipment power usage (in watts), and $R_L$ for each line resistance (½the total loop resistance of the span, in ohms):

$$V_{TE} = \frac{V_{CO} \pm \sqrt{V_{CO}^2 - 8 \cdot P \cdot R_L}}{2} \text{ for } V_{CO}^2 - 8 \cdot P \cdot R_L \geq 0 \quad (1)$$

From equation (1) it can be seen that the term under the radical must be greater than or equal to zero for operation. In physical terms, for a given CO voltage and a specific amount of line resistance RL only a certain amount of power is available to the terminal equipment. Equation (1) shows two solutions when operating at less than the maximum available power. When the power is at the maximum, the radical term is zero and both operating points are $V_{CO}/2$. For the cases of less than maximum power, the lower operating point is an unstable inflection point. If the terminal equipment draws incrementally less power than is available, the voltage will rise to the stable upper operating point. If, for any reason, the terminal equipment attempts to consume more power than can be provided, the voltage at the terminal equipment will collapse and the available power will actually decrease.

For example, if the CO voltage is 100 volts and the loop resistance is 2500 ohms, then the maximum power available is one watt. This corresponds to a voltage of 50 volts at the terminal equipment and a line current of 20 mA. If the terminal equipment marginally increases the current in an effort to increase power, the voltage and available power will drop. For example, increasing the current from 20 mA to 21 mA will cause the voltage at the terminal equipment to drop to 47.5 volts and the power to drop to 0.9975 watts. In an effort to maintain the power balance, the current will continue increasing (and the power will continue decreasing), so the voltage will rapidly fall to zero (zero power) of course, at some minimum voltage the terminal equipment will fail to operate and will shut down and restart.

During some occasions, such as phone ringing or transients, the instantaneous power required by the terminal equipment may actually exceed the maximum available amount of span power (e.g., 1100 mW, in the present example), so that some mechanism must be employed to prevent the line from collapsing and losing power. The above-referenced ETR080 reports suggests limiting the current in the terminating equipment. Although this may suffice for some applications, it would be very difficult to implement in devices that temporarily exceed the available power.

For example, with a CO voltage of 51–115 VDC, a linear current limit would need to be set at 43.1 mA for operation at 51 volts. At 115 volts, on the other hand, the current limit needs to be set at 19.1 mA. Since the terminating device cannot easily determine what the CO voltage is, it would be very difficult to adequately set the appropriate current limit, without intentionally sacrificing maximum power capability for the sake of stability. In addition, the use of current limiting circuitry may reduce the power conversion efficiency, which further reduces available power and may generate excessive heat.

As described briefly above, rather than limit current or attempt to monitor CO voltage, the present invention attacks the fundamental problem of limiting the terminal equipment power so as to ensure proper operation. The terminal equipment power P to be limited is generally expressible as $P=V_{TE}*I_{TE}$, where $V_{TE}$ is the voltage across terminal equipment power supply nodes (+TE) and (−TE), and $I_{TE}$ is the current drawn by the terminal equipment through those power supply nodes. The power limited converter of the span interface unit is controlled so as to regulate the value of P to a limited maximum (e.g., 1100 mW) on a dynamic basis, in response to respective voltage and current measurements.

Figure 2:
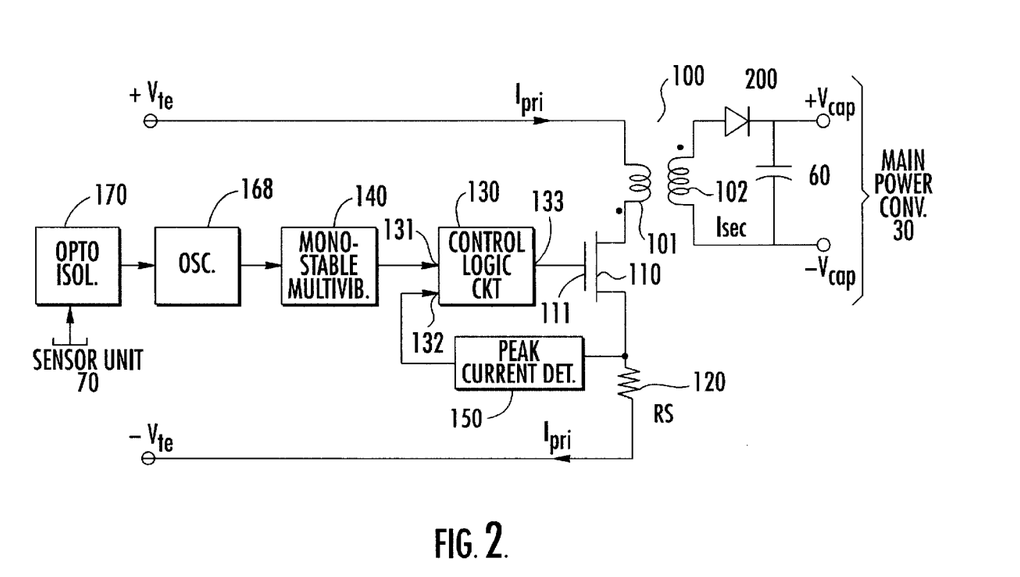
FIG. 2 is a reduced complexity diagram of that portion of the power management system of FIG. 1 which controllably charges the auxiliary storage capacitor.

Attention is now directed to FIG. 2, which is a reduced complexity diagram of that portion of the power management system of FIG. 1, including the span interface section 20, which is operative to controllably charge the auxiliary storage capacitor 60 with a limited amount of energy extracted from the span, so that the main power converter 30 may continue to supply regulated voltages for terminal equipment operation, in the event that the normally supplied local utility power is inadequate or absent. As shown therein, coupled in circuit with a pair of terminal equipment nodes +Vte and −Vte (through which the remotely powered span is coupled to the terminal equipment) is a series connection of a primary winding 101 of an isolation barrier transformer 100, the drain-source path of an electronically controlled switch (shown as a MOSFET) 110, and a current-sensing resistor 120. The isolation barrier transformer 100 has a secondary winding 102 coupled through a rectifier 200 to the auxiliary storage capacitor 60, the voltage across which is provided at nodes +Vcap and −Vcap, and represents the voltage available to the main power converter 30 for supplying operating voltages to the terminal equipment.

The control gate 111 of the MOSFET 110 is coupled to the gate drive output 133 of a control logic circuit 130, which has a turn on or start port 131 coupled to the output of a monostable multivibrator 140, and a stop or reset port 132 coupled to a peak current detector 150, which monitors the voltage across and thereby the current flowing through current-sensing resistor 120. The monostable multivibrator 140 is triggered by the output of a variable frequency oscillator 160, which outputs a variable frequency signal (e.g., square wave at 600 Hz for wetting current (44 mW) up to 15 kHz (1100 mW) at full power), for controlling the duty cycle and recharge rate of the capacitor 60. The variable frequency oscillator 160 has its input coupled via an opto-isolator 170 to receive a variable frequency control signal from sensing and control unit 70. The monostable multivibrator 140 outputs a pulse at each positive clock transition of the output of the oscillator 160, which is latched by the logic block circuit 130 to place the MOSFET 110 in the conducting state. When the peak current detector 150 detects a peak current (around 200 mA), it triggers control logic circuitry 130 to switch the MOSFET 110 to the non-conducting state. MOSFET 110 remains in its non-conductive state until the next pulse from the monostable multivibrator 140.

The fundamental operation of the power management circuitry of FIG. 2 is as follows. When the MOSFET 110 is turned on, the conductive state of its drain-source path causes most of the span voltage $V_{TE}$ across terminals (+Vte)−(−Vte) to be coupled across the primary winding 101 of transformer 100. The voltage across the secondary winding 102 is related to the ratio of the number of secondary turns to primary turns times the span voltage $V_{TE}$.

In the diagram of FIG. 2, the relative polarities of the primary and secondary windings 101 and 102 of transformer 100 and the orientation of diode 200 and prevent the flow of current $I_{sec}$ in the secondary winding 102, when the primary winding 101 is conducting. When the MOSFET 110 turns off, the diode 202 begins conducting. During conduction of the diode 200, the voltage across the secondary winding 102 is essentially the voltage of the storage capacitor 60. The reflected voltage seen on the primary winding 101 is related to the ratio of the number of primary turns to the number of secondary turns times the voltage across the capacitor 60 $V_{CAP}$. The capacitor voltage can be higher or lower than the primary voltage depending on operating conditions and design.

Figure 3:
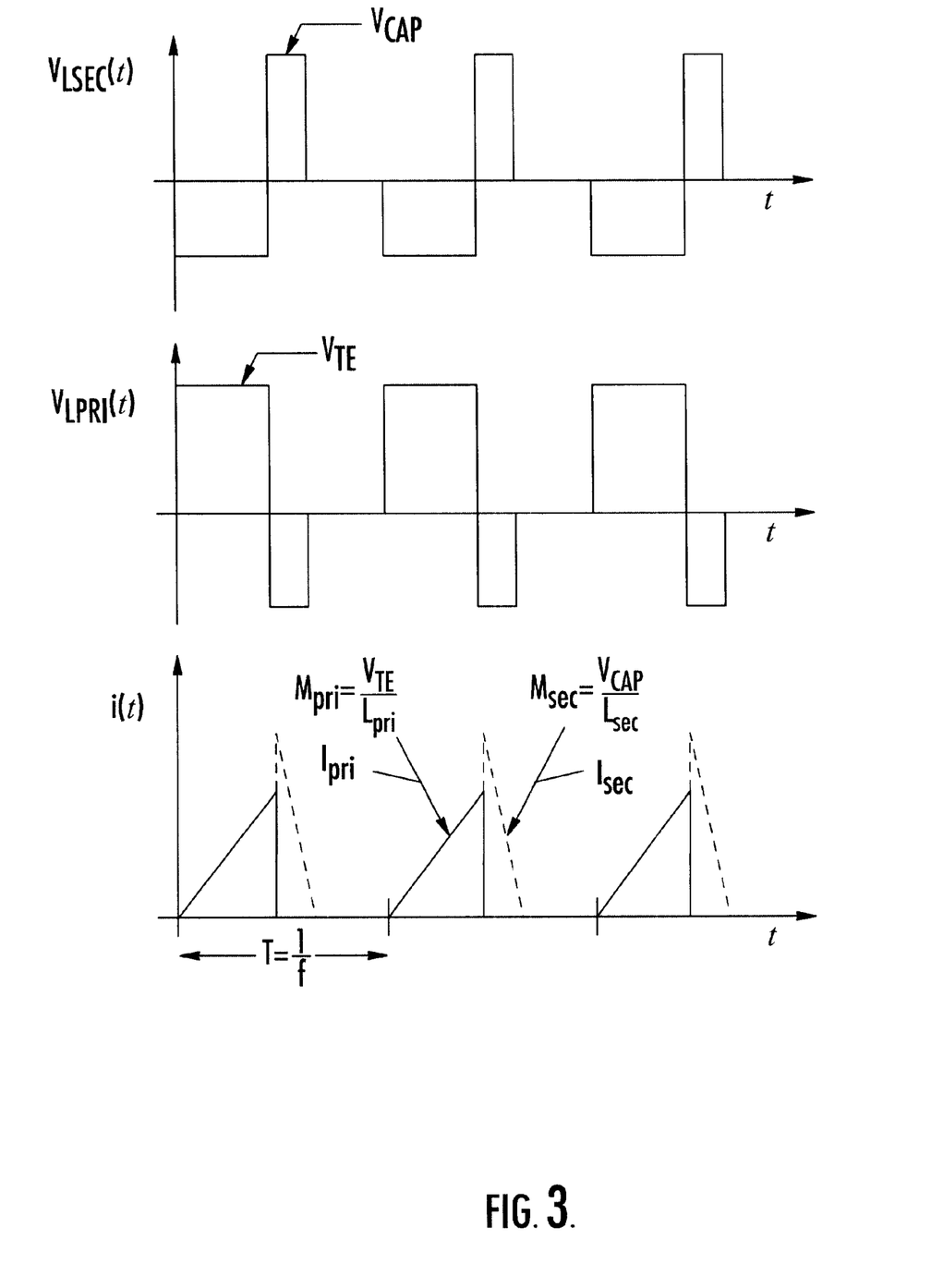
FIG. 3 shows voltage and current waveforms associated with the operation of the circuit of FIG. 2.

The waveforms of FIG. 3 show both winding voltages returning to zero during the dead time. In actual operation the voltages will oscillate with minimal damping. This oscillation is primarily due to energy stored in the MOSFET 10 drain capacitance at the end of the switching cycle. Without the forced applied voltage, this stored energy resonates back to the supply through the high Q circuit of the input capacitance, drain capacitance, and inductor primary inductance and winding capacitance.

As shown in the current waveform of FIG. 3, the current $I_{pri}$ through the primary winding 101 increases approximately linearly with time, at a rate determined by the winding voltage and primary inductance ($\Delta I_{pri} \approx V_{TE} * \Delta t / L_{pri}$), thereby storing energy in the air gap of the coupled windings 101 and 102. This increase in current through the primary winding 101 is not strictly linear, due to parasitic drops across the MOSFET 110, the current sensing resistor 120, winding resistance, inductance changes with magnetic flux, etc. However, primary winding current flow linearity is not necessarily critical.

When the peak detector 150 senses that the value of the primary current $I_{pri}$ has increased to a prescribed level, the input to the stop port 132 of the control logic circuit 130 will change state, causing the control circuit 130 to switch MOSFET 110 to the "off" or non-conducting state, thereby interrupting the current flow through the primary winding 101. The magnetic flux in the coupled windings 101–102 causes the winding voltages to switch polarities, as shown at waveforms $V_{LSEC}$ (t) and $V_{LPRI}$ (t) in FIG. 3, and forces the diode 200 into forward conduction. The energy stored in the transformer is then transferred to the capacitor 60 as the secondary current $I_{sec}$ decays in a generally linear fashion. The decay of the secondary current $I_{sec}$ occurs at a time rate determined by capacitor 60's voltage and secondary inductance (($\Delta I_{sec} \approx V_{cap} * \Delta t / L_{sec}$). After the energy transfer and a certain amount of idle time has elapsed, this cycle repeats. Thus, a power-limiting function is achieved by controllably modulating the charging of the capacitor 60.

The power drawn by the circuit of FIG. 2 is ideally determined by equation (2) as follows:

$$Pin = \frac{1}{2} \cdot L_{pri} \cdot I_{pk}^2 \cdot f \quad (2)$$

where $L_{pri}$ is the inductance of primary winding 101, $I_{pk}$ is the peak current at the switching instant, and f is the repetition rate or frequency of the output signal generated by oscillator 160. $L_{pri}$ is a function of the inductor (winding) design and construction. $I_{pk}$ and f are circuit variables that can be modified during operation to control power transfer. The values for these parameters are chosen to very precisely limit the power to conform with a given specification (e.g., 1100 mW). Also, the frequency of the oscillator output signal is adjusted automatically to modulate power transfer, thereby regulating the energy in the storage capacitor 60.

As pointed out above, when the terminal equipment is being powered by the local utility interface 10, the frequency of the output waveform generated by the variable frequency oscillator 160 is reduced to its minimum value, so that the power being delivered by the span is reduced to only the level of wetting current. In the absence of local power, however, the oscillator output frequency is either at a maximum—providing a maximum amount of limited power (e.g., 1100 mW)—or it is modulated between its minimum and maximum values for energy regulation.

Attention is now directed to FIGS. 4–4A, 4B and 5, which schematically illustrate a non-limiting example of a circuit implementation of the power management system of FIGS. 1 and 2. The respectively identified circuits that make up the functional elements of FIGS. 1 and 2 are configured in a conventional manner and are self-evident to one skilled in the art from the schematics. As a consequence, in order to avoid unnecessarily cluttering the drawings, the components that make up such circuits (including passive components such as, but not limited to, resistors, capacitors, inductors, diodes, and the like, and active components such as, but not limited to, bipolar transistors, MOSFETs, biasing nodes and the like) are for the most part not individually numerically labeled and will not be described.

Figure 5:
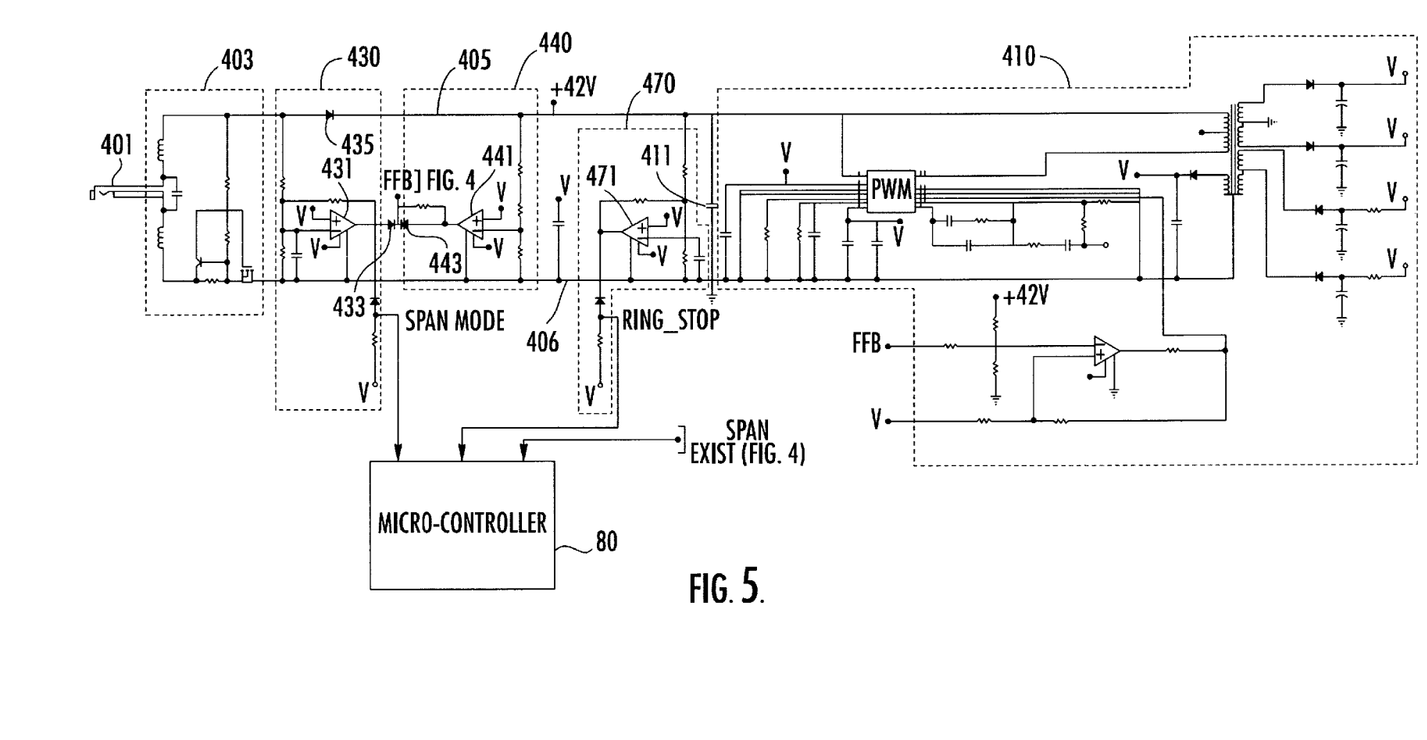

As shown in FIG. 5, the wall transformer connection for v the local utility interface section 10 includes a power supply jack 401, which is coupled through an electromagnetic interference (EMI) and inrush current filter 403. The wall transformer transforms the utility voltage to a safe level, such as 42 VDC, so that respective DC voltage potentials (e.g., 42 VDC and ground (GND), as shown, are coupled to a first DC voltage line pair 405 and 406. Coupled in circuit with the local power supply line pair 405 and 406 is a DC-DC voltage converter 410, which corresponds to the main power converter 50, supplying various regulated voltages for the equipment's communication subsystems, as described above.

The local power supply line pair 405 and 406 is further coupled to an auxiliary energy storage capacitor 411, which forms a first parallel-connected portion of the auxiliary storage capacitor 60. A second parallel-connected portion of the auxiliary storage capacitor 60 is provided by a further auxiliary energy storage capacitor 412, which is coupled in circuit with the secondary winding 422 of a transformer 420 of the power limited converter of the span interface section, described with reference to FIG. 3. Capacitors 411 and 412 are charged from the local utility supply through a diode 435 in the local power supply line 405.

Also coupled in circuit with the local power supply line pair 405 and 406 are a set of operating condition sensing circuits that make up the sensing and control unit 70. This set of sensing circuits includes a voltage (threshold) sensor unit 430, which monitors the level of the voltage across the power supply jack 401 to determine whether sufficient power is being supplied from the local utility interface to power the user's terminal equipment. If the local utility supplied voltage level drops below a prescribed level, the output of a threshold detector 431 at a signal node SPAN_MODE changes state, indicating to the terminal equipment's control processor that span-powering is being initiated, so that the processor will reduce its power consumption to a more conservative 'maintenance' power mode.

The change in state in the output of threshold detector 431 is also coupled through a diode 433 to a frequency feedback (FFB node, which serves as the control node for a capacitor-charging modulation oscillator 450 (which corresponds to the oscillator 160 in FIG. 2), and controls the charging of the capacitor pair 411–412 (which corresponds to the storage capacitor 60 in FIGS. 1 and 2). As long as the voltage state of the terminal node FFB is high, the local oscillator frequency for controlling the charging of the auxiliary energy storage capacitor pair 411–412 is reduced to its minimum value, so that only wetting current is drawn from the span. If the voltage state of the terminal node FFB goes low, the local oscillator frequency for controlling the charging of the auxiliary energy storage capacitor pair 411–412 is controllably increased from its minimum value, as necessary for controlling the recharging of the capacitor.

A voltage (threshold) sensor unit 440 is coupled across energy storage capacitors 411–412, and is operative to monitor the amount of energy stored in the parallel-connected pair of auxiliary energy storage capacitors 411–412 and to adjust, as necessary, the frequency of charging modulation oscillator 450 (which corresponds to the oscillator 160 in FIG. 2), based on the charge on the storage capacitor pair, and thereby modulation of the span interface section's power limited converter. For this purpose, the sensor unit 440 includes a threshold detector 441, the output of which is coupled through a diode 443 to the terminal node FFB. When the charge on the capacitor pair 411–412 is reduced to less than a prescribed minimum, the output of threshold detector changes state (goes low). Since the outputs of threshold detectors 431 and 441 are diode-ORed to node FFB, the node FFB goes low, increasing the oscillator frequency and power transform to maximum. To provide undervoltage lockout (UTVLO) protection, referenced previously, oscillator 450 is coupled to an associated undervoltage lockout circuit 455.

A third voltage (threshold) sensor unit 470 is coupled across local power supply rails 405 and 406, and is also operative to monitor the amount of energy stored in auxiliary energy storage capacitors 411–412. Should the charge level drop to less than a prescribed threshold associated with a minimum value necessary for the terminal equipment to operate, the output of a threshold detector 471 at a signal node RING_STOP changes state, indicating to the terminal equipment's control processor that ringing of the terminal equipment's ringing circuitry is to be temporarily inhibited, so as to prevent the terminal equipment from being shut down. As pointed out above, ringing is allowed to continue during the next cadence period.

The output of the oscillator 450 is coupled to a monostable multivibrator 480, which corresponds to monostable multivibrator 140 of FIG. 2. To provide span undervoltage lockout (UVLO) protection, monostable multivibrator 480 includes an output AND gate 482, having a SPAN_UVLO input coupled to a span undervoltage lockout circuit 485. The output of AND gate 482 is coupled to a turn on or start input 501 of control logic circuit 500, which corresponds to the control logic circuit 130 of FIG. 2, and is comprised of a pair of cross-coupled AND gates 505 and 506.

The control logic circuit 500 has a stop input 502 coupled to a peak current detector 510 (which corresponds to the peak detector 150 of FIG. 2). The peak current detector 510 is coupled to monitor the voltage across and thereby the current flowing through a sense resistor 520 (which corresponds to the current-sensing resistor 120 of FIG. 2). The sense resistor 520 is coupled in the drain-source path of a MOSFET 110 (which corresponds to the MOSFET 110 of FIG. 2). As in FIG. 2, the drain-source current flow path of MOSFET 110 is coupled in circuit with the primary winding 421 of isolation barrier transformer 420, so that current flow therethrough and thereby the charging of capacitor pair 411–412 coupled to secondary winding 422 may be modulated by controllably interrupting the current flow through MOSFET 110.

In addition to being coupled to the further auxiliary energy storage capacitor 412, the secondary winding 422 is coupled to an interface circuit 425, through which the control processor 80 monitors whether span power is actually available. As long as span power is available, there will be energy transfer from the primary to the secondary windings of the transformer 420 of the power-limited converter, which is detected by interface circuit 425. The presence of span power is indicated by the logic level of a SPAN_EXIST node, which is monitored by the terminal equipment's control processor. Should this logic level change from what should be a continuous state, it indicates that there is a problem at CO ISDN switch at the remote end of the span.

On its primary side, transformer 420 includes a further winding 423, which is coupled to a start-up circuit 530, referenced above. The two primary side windings 421 and 423 are coupled via a full-wave rectifier 540 to respective span-coupled terminals U+ and U−, which effectively correspond to the respective terminals (+Vte)–(−Vte) of FIG. 2. As shown in FIG. 4, these terminals are coupled through the primary winding side 551 of a signal-coupling transformer 550 to respective ports 561 and 562 of a telephone line jack 560. The telephone line jack ports 561 and 562 correspond to the first and second ports 21 and 22 of the span interface section 20, and provide connections to respective segments 41 and 42 of the telephone line signaling pair (span) 43, which are powered from remote telecommunication service provider facility 40. Transformer 550 is shown as having a secondary winding side 552 coupled to an ISDN 'U'—interface chip 570 of the user's terminal equipment.

As will be appreciated from the foregoing description, the desire to span-power terminating devices in the event of a loss in local utility power, while at the same time limiting the power that can be extracted from the span, are effectively satisfied by the dual power management system of the present invention, which monitors the power availability for and requirements of termination equipment. Upon detecting that the local utility power is insufficient to maintain operation, the invention derives from the phone line up to a maximum amount of power, which is limited to a fixed value that prevents the line from collapsing, and satisfies current industry proposals, such as that contained in the above-referenced ETR080 report.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A system for managing the application of power to a digital data services telecommunication device terminating a powered telecommunication span and being coupled to receive power from a local utility interface comprising:

a local utility interface which isolates and transforms a local utility voltage to a prescribed DC level;

a main power converter coupled to said local utility interface and being operative to supply regulated voltages for communication subsystems of said telecommunication device;

a span interface which interfaces telecommunication signals between said telecommunication device and said telecommunication span, and sinks wetting current from said telecommunication span, and contains a power limited converter which is controllably operative, in response to insufficient power being supplied by said local utility interface, to derive a limited amount of power from said telecommunication span sufficient to operate said telecommunication device; and an auxiliary energy storage device coupled to said main power converter, and wherein said power limited converter is operative, in response to a reduction in or loss of power from said local utility interface, to controllably store energy in said auxiliary energy storage device from a limited amount of power extracted from said telecommunication span.

2. A system according to claim 1, wherein said power limited converter is operative to controllably draw a maximum amount of said limited power available from the network until said auxiliary energy storage device stores its maximum capacity of energy, and thereafter controllably modulating power from said telecommunication span so as to draw only energy necessary for operation of said telecommunication device.

3. A system according to claim 1, wherein said power limited converter is operative to temporarily inhibit ringing, in response to energy available from said auxiliary storage device being insufficient to both operate said telecommunication device and generate a ringing signal.

4. A method of operating digital terminal equipment, which is coupled to a communication link, and is operative to conduct digital communications over said communication link, said communication link being powered by way of a telecommunication facility that is remote with respect to said digital terminal equipment, said method comprising the steps of:
 (a) for a first, normal mode of operation of a local power source, deriving power for operating said digital terminal equipment from said local power source, so that said digital terminal equipment may conduct digital communications over said communication link;
 (b) for a second, abnormal mode of operation of said local power source in which power from said local power source is insufficient to operate said digital terminal equipment, maintaining operation of said digital terminal equipment, so that said digital terminal equipment may continue to conduct digital communications over said communication link, by deriving power for operating said digital terminal equipment from said communication link, and limiting said power derived from said communication link to no more than a prescribed limited amount of power.

5. The method according to claim 4, wherein step (b) comprises controllably modulating power derived from said communication link to store energy for operating said digital terminal equipment in an auxiliary power storage device.

6. The method according to claim 5, wherein step (b) comprises controllably operating a ringing circuit of said digital terminal equipment using energy stored in said auxiliary power storage device.

7. The method according to claim 6, wherein operation of said ringing circuit requires power in excess of said prescribed limited amount of power.

8. The method according to claim 5, wherein step (b) comprises, in response to said prescribed limited amount of power derived from said communication link being insufficient to operate said digital terminal equipment, maintaining operation of said digital terminal equipment, so that said digital terminal equipment may continue to conduct digital communications over said communication link, by deriving power for operating said digital terminal equipment from energy stored in said auxiliary power storage device.

9. The method according to claim 8, wherein step (b) further comprises limiting operation of a ringing circuit of said digital terminal equipment, in response to power available from said communication link and said auxiliary power storage device being insufficient to operate said digital terminal equipment.

10. The method according to claim 4, wherein step (a) further includes storing, in an auxiliary power storage device, power supplied from said local power source, in addition to that required for operating said digital terminal equipment.

11. The method according to claim 10, wherein step (b) comprises operating a ringing circuit of said digital terminal equipment using power derived from at least one of energy stored in said auxiliary power storage device and power derived from said communication link.

12. An apparatus for operating digital terminal equipment, which is coupled to and is operative to conduct digital communications over a communication link, said communication link being powered by way of a telecommunication facility that is remote with respect to said digital communication terminal equipment, said apparatus comprising:
 a first power coupling circuit, which is operative, for a first, normal mode of operation of a local power source, to derive power for operating said digital terminal equipment, from said local power source, so that said digital terminal equipment may conduct digital communications over said communication link; and
 a second power coupling circuit, which is operative, for a second, abnormal mode of operation of said local power source in which power from said local power source is insufficient to operate said digital terminal equipment, to maintain operation of said digital terminal equipment, so that said digital terminal equipment may continue to conduct digital communications over said communication link, by deriving power for said digital terminal equipment from said communication link, and limiting said power derived from said communication link to no more than a prescribed limited amount of power.

13. The apparatus according to claim 12, wherein said second power coupling circuit is operative to controllably modulate power derived from said communication link in order to store energy for operating said digital terminal equipment in an auxiliary power storage device.

14. The apparatus according to claim 13, wherein said second power coupling circuit is operative to controllably operate a ringing circuit of said digital terminal equipment using energy stored in said auxiliary power storage device.

15. The apparatus according to claim 14, wherein operation of said ringing circuit requires power in excess of said prescribed limited amount of power.

16. The apparatus according to claim 13, wherein said second power coupling circuit is operative, in response to said prescribed limited amount of power derived from said communication link being insufficient to operate said digital terminal equipment to maintain operation of said digital terminal equipment, so that said digital terminal equipment may continue to conduct digital communications over said communication link, by deriving power for operating said digital terminal equipment from energy stored in said auxiliary power storage device.

17. The apparatus according to claim 16, wherein said second power coupling circuit is operative to limit operation of a ringing circuit of said digital terminal equipment, in response to power available from said communication link and said auxiliary power storage device being insufficient to operate said digital terminal equipment.

18. The apparatus according to claim 13, wherein said first power coupling circuit is operative to store, in an auxiliary power storage device, power supplied from said local power source, in addition to that required for operating said digital terminal equipment.

19. The apparatus according to claim 18, wherein said second power coupling circuit is operative to supply power to a ringing circuit of said digital terminal equipment using power derived from at least one of energy stored in said auxiliary power storage device and power derived from said communication link.

\* \* \* \* \*

UNITED STATES PATENT AND TRADEMARK OFFICE
CERTIFICATE OF CORRECTION

PATENT NO. : 6,584,197 B1
DATED : June 24, 2003
INVENTOR(S) : Ralph R. Boudreaux, Jr.

Figure 4A:
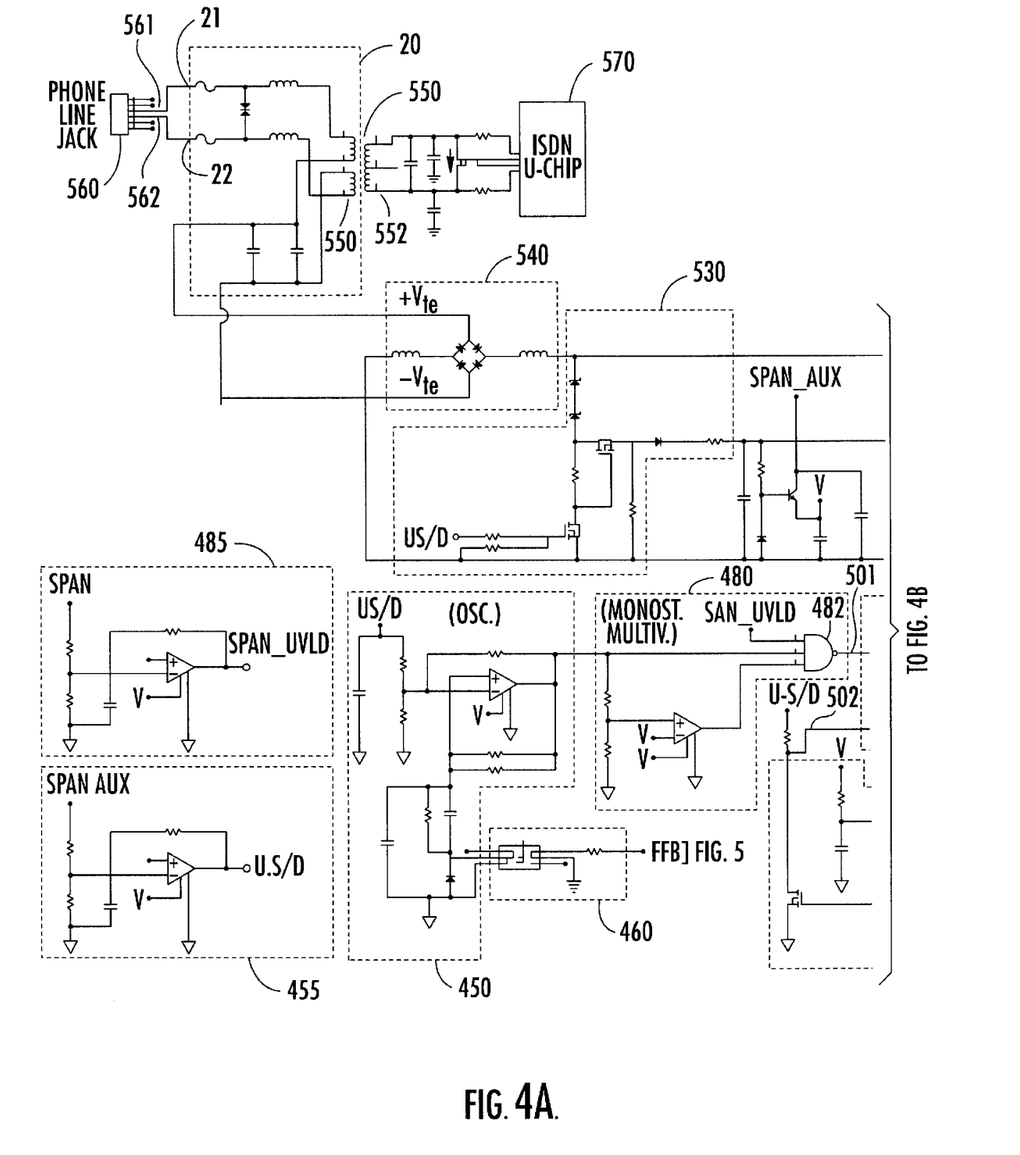
Figure 4B:
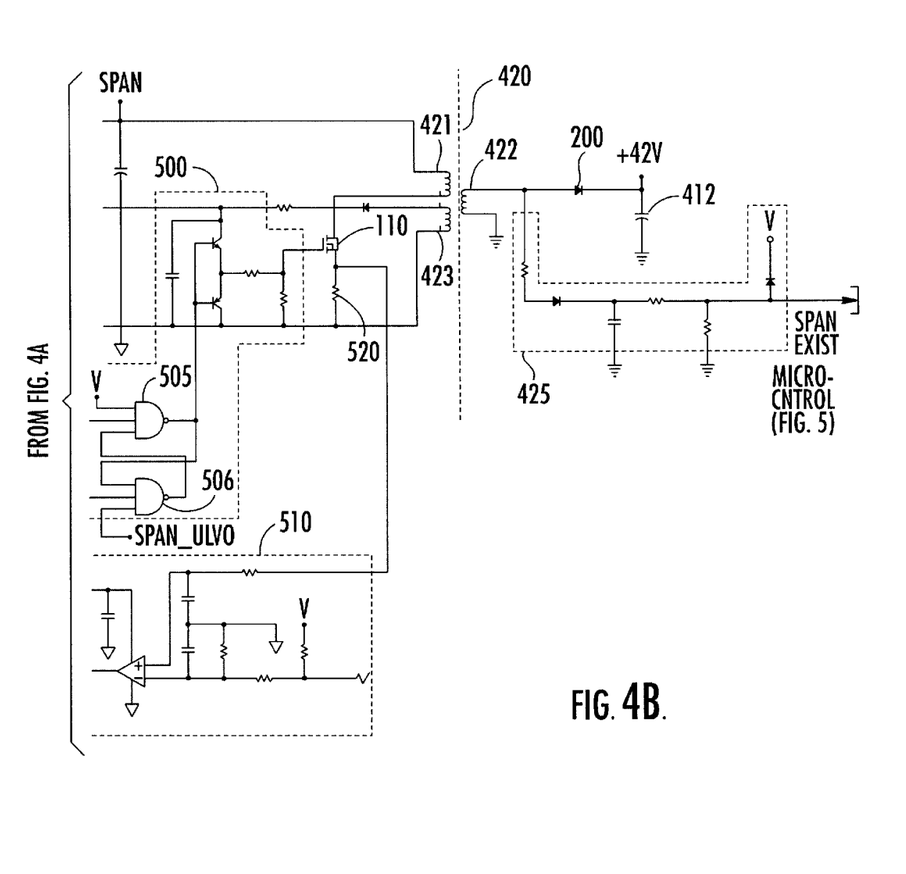

It is certified that error appears in the above-identified patent and that said Letters Patent is hereby corrected as shown below:

Column 4,
Line 24, delete "FIGS. 4—4A, 4B and 5" insert -- FIGS. 4A, 4B and 5 --
Lines 27-45, Delete: "FIG. 1 diagrammatically illustrates the general architecture of the dual power management system of the present invention that includes a local utility interface section 10 and a span interface section 20. The local utility interface section 10 includes barrier— isolation circuitry (e.g., transformer) 11 configured to plug into a standard local utility interface (AC wall outlet) 12. The wall transformer isolates and transforms the utility voltage to a safe level, such as 42 VDC. As long as the local utility interface and the wall transformer are properly connected and operating normally, a main power converter 30 coupled thereto will supply regulated voltages for the terminal equipment's communication subsystems 32 (such as but not limited to logic circuits, computer data interface, user interface displays, POTs interface, etc.) However, if there is a failure or unacceptable reduction of the local utility power, a power limited converter 50 within the span interface unit 20 will be controlled, so as to increase power transfer from the central office to the terminal equipment and thereby maintain terminal equipment operation."

Column 5,
Line 26, delete "is a failure of unacceptable" insert -- is a failure or unacceptable --

Column 6,
Line 8, delete "FIGS. 4—4A, 4B and 5, to" insert -- FIGS. 4A, 4B and 5, to --

Column 10,
Line 6, delete "FIGS. 4—4A, 4B and 5, which" insert
-- FIGS. 4A, 4B and 5, which --

UNITED STATES PATENT AND TRADEMARK OFFICE
CERTIFICATE OF CORRECTION

PATENT NO. : 6,584,197 B1
DATED : June 24, 2003
INVENTOR(S) : Ralph R. Boudreaux, Jr.

It is certified that error appears in the above-identified patent and that said Letters Patent is hereby corrected as shown below:

<u>Column 11,</u>
Line 24, delete "lockout (UTVLO) protection," insert -- lockout (UVLO) protection, --

Signed and Sealed this

Fourth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,584,197 B1
DATED : June 24, 2003
INVENTOR(S) : Boudreaux Jr. et al.

It is certified that error appears in the above-identified patent and that said Letters Patent is hereby corrected as shown below:

<u>Title page,</u>
Item [75], Inventors, please add the names -- Ralph R. Boudreaux Jr., Steven M. Robinson, John S. McGary & Paul G. McElroy --

Signed and Sealed this

Twenty-seventh Day of January, 2004

JON W. DUDAS
*Acting Director of the United States Patent and Trademark Office*